United States Patent [19]
Johnson

[11] Patent Number: 5,166,745
[45] Date of Patent: Nov. 24, 1992

[54] RAPID RE-TARGETING, SPACE-BASED, BORESIGHT ALIGNMENT SYSTEM AND METHOD FOR NEUTRAL PARTICLE BEAMS

[75] Inventor: William M. Johnson, Sudbury, Mass.

[73] Assignee: The Charles Stark Draper Laboratory, Inc., Cambridge, Mass.

[21] Appl. No.: 517,152

[22] Filed: May 1, 1990

[51] Int. Cl.⁵ .................................... G01B 11/27
[52] U.S. Cl. .................... 356/152; 89/1.11; 244/158 R
[58] Field of Search .......... 89/1.11, 41.03, 41.06, 89/41.22; 244/158 R; 356/152

[56] References Cited

U.S. PATENT DOCUMENTS

| | | | |
|---|---|---|---|
| H311 | 7/1987 | Jones et al. | 372/9 |
| Re. 31,478 | 12/1983 | McArthur et al. | 219/121 LK |
| 3,995,944 | 12/1976 | Queeney | 350/285 |
| 4,063,819 | 12/1977 | Hayes | 356/152 |
| 4,298,798 | 11/1981 | Huffman | 250/423 R |
| 4,517,566 | 5/1985 | Bryant et al. | 343/8 |
| 4,571,076 | 2/1986 | Johnson | 356/152 |
| 4,580,270 | 4/1986 | Johnson et al. | 372/107 |
| 4,584,161 | 4/1986 | Post, Jr. et al. | 376/143 |
| 4,614,913 | 9/1986 | Honeycutt et al. | 356/152 |
| 4,633,749 | 12/1986 | Trageser | 372/107 |
| 4,662,727 | 5/1987 | Griffin | 356/152 |
| 4,674,395 | 6/1987 | Scheipner | 89/41.19 |
| 4,684,796 | 8/1987 | Johnson | 250/201 |
| 4,688,086 | 8/1987 | Hutchin | 356/353 |
| 4,700,068 | 10/1987 | McClung, Jr. et al. | 250/251 |
| 4,766,393 | 8/1988 | Johnson | 330/4.3 |
| 4,767,209 | 8/1988 | Johnson | 356/152 |
| 4,772,121 | 9/1988 | Trageser | 356/152 |
| 4,773,078 | 9/1988 | Johnson | 372/99 |
| 4,774,473 | 9/1988 | Johnson et al. | 330/4.3 |
| 4,798,462 | 1/1989 | Byren | 356/152 |
| 4,910,596 | 3/1990 | Kieft | 358/160 |
| 4,981,354 | 1/1991 | DeHainaut et al. | 356/152 |

OTHER PUBLICATIONS

J. Hecht, Beam Weapons, 1984, Plenum Press, p. 231.
P. Klass, Aviation Week & Space Tech., Aug. 24, 1981, p. 62.

Primary Examiner—Stephen C. Bentley
Attorney, Agent, or Firm—Weingarten, Schurgin, Gagnebin & Hayes

[57] ABSTRACT

Apparatus and method are disclosed enabling to register vectors respectively representative of directed energy pointing direction and targeted object pointing direction to allow rapid re-targeting boresight alignment transfer of a space-based neutral particle beam to targeted ballistic missile trajectories independently of relative reference frame vector measurement uncertainty arising from platform vibration and, among other things, space-noise.

33 Claims, 5 Drawing Sheets

RAPID RE-TARGETING, SPACE-BASED, BORESIGHT ALIGNMENT SYSTEM AND METHOD FOR NEUTRAL PARTICLE BEAMS

FIELD OF THE INVENTION

This invention is directed to the field of directed energy weapons, and more particularly, to a novel rapid re-targeting, space-based, boresight alignment system and method for particle beams.

BACKGROUND OF THE INVENTION

The deployment of a particle beam source in earth orbit so as to confront probable launch corridors for ballistic missiles and operative to deliver the force of the particle beam to ballistic missiles that appear in the missile corridors to thwart an attack has been envisioned as one solution to the problem of providing a reliable ballistic missile defense system. Particle beam sources are distinguished as a class from laser sources of directed energy, and the types of particle beam sources that have been proposed include those that provide charged as well as uncharged particles. These non-light sources of directed energy need to be so controlled that the particle beam is boresight aligned to the trajectories of the ballistic missiles.

In general, before the particle beams can be boresight aligned to the ballistic missiles, it is necessary to both track the missiles in such a way that their space-time coordinates are known as well as to so sense the particle beam of the particle beam source that its pointing direction is known. From the one, the vectors to the targets may be determined, and from the other, the vector representative of the pointing direction of the particle beam may be determined.

In U.S. Pat. No. 4,700,068, to McClung, Jr. et al., incorporated herein by reference, several methods of detecting the pointing direction of a neutral particle beam are disclosed, including the use of a pin-hole sensor, laser resonance fluorescence, and a wire sensor. In commonly-assigned co-pending allowed United States utility patent application Ser. No. 927,266, to Johnson, entitled BALLISTIC MISSILE BORESIGHT AND INERTIAL TRACKING SYSTEM AND METHOD, incorporated herein by reference, there is disclosed, among other things, an inertial tracker operative to provide the space-time coordinates and angular rate coordinates of targeted ballistic missiles with respect to inertial space.

It is not possible in a practicable embodiment to boresight align the particle beam to the space-time coordinates of the trajectories of ballistic missiles merely from the vector representative of the pointing direction of the particle beam weapon and from the pointing direction vectors to the ballistic missile trajectories derived from the space-time and angular rate coordinates of the ballistic missiles with respect to inertial space and from the range of the ballistic missiles. The problem occurs due to an uncertainty that exists between the reference frame in which the vector representative of the pointing direction of the neutral particle beam is measured and the reference frame in which the vectors representative of the pointing direction to the ballistic missile trajectories are measured. The degree of the uncertainty depends on the rigidity of the platform or other coupling between the source of the particle beam and the ballistic missile inertial or other tracker, and the vibrational modes of the platform arising from space-noise and other factors. The uncertainty decouples the reference frames and therewith the vectors representative of the pointing direction to the targeted ballistic missile trajectories from the vector representative of the pointing direction of the particle beam source and thereby effectively prevents accurate registration of the particle beam to the targeted ballistic missiles.

In addition, it must be possible in a practicable embodiment to provide rapid re-targeting of boresight aligned ballistic missiles. To the extent the such a capability is absent, to the same extent the assurance is lessened that the neutral particle beam will thwart the ballistic missile attack.

SUMMARY OF THE INVENTION

In accord with one of its objects, the present invention discloses boresight alignment means for registering the vector representative of the pointing direction of a particle beam of a space-based particle beam source to vectors representative of the pointing direction to targeted ballistic missile trajectories with repect to a common reference frame thereby enabling to deliver the force of the particle beam to the ballistic missiles with assured lethality. In the presently preferred embodiments thereof, the boresight alignment means includes a registration laser injected into a neutral particle beam, and a wire sensor means defining a frame of reference positioned along a path that is common to both the registration laser and the neutral particle beam. The common path wire sensor means provides signals representative of the relative pointing directions of the neutral particle beam and registration laser with respect to the frame of reference of the common wire sensor. An inertial tracker having a ballistic missile tracking sensor provides signals representative of the pointing direction to the targeted ballistic missiles with respect to inertial space, and means are disclosed for imaging the same registration laser on the ballistic missile tracking sensor to provide a signal representative of the pointing direction of the registration laser with respect to inertial space. The neutral particle beam is controllably pointed by magnetic optics, and in one embodiment, the imaging means includes a sampling element positioned upstream of the magnetic optics, and in another embodiment, the sampling element is positioned downstream of the magnetic optics. In both embodiments, control means responsive to the signals representative of the pointing direction of the neutral particle beam and registration laser with respect to the frame of reference of the common wire sensor and responsive to the signal representative of the pointing direction of the same registration laser with respect to inertial space are disclosed for registering the pointing direction of the neutral particle beam to the targeted ballistic missile trajectories. Platform non-rigidity and vibrational modes induced boresight alignment uncertainties are thereby effectively eliminated.

According to another one of its objects, the present invention discloses rapid re-targeting means for controllably pointing the neutral particle beam to the trajectories of the targeted ballistic missiles to effectively deliver the force of the same onto the missiles to thwart an attack. In one presently preferred embodiment thereof, means are disclosed for maintaining the pointing directions of the neutral particle beam and registration laser in parallel and aligned with the vector representative of the pointing direction to a targeted ballistic missile, and means are disclosed for deviating the particle beam off-axis at a preselected point-ahead angle selected to intercept the ballistic missile trajectories. In another presently preferred embodiment thereof, means are disclosed for maintaining the pointing directions of the neutral particle beam and registration laser in parallel and aligned with the vectors representative of the pointing direction to the ballistic missile trajectories.

BRIEF DESCRIPTION OF THE DRAWINGS

These and other objects, advantages and features of the instant invention will become apparent as the invention becomes better understood by referring to the following solely exemplary detailed description of the preferred embodiments, and to the drawings, wherein.

DETAILED DESCRIPTION OF THE PREFERRED EMBODIMENTS

Figure 1:
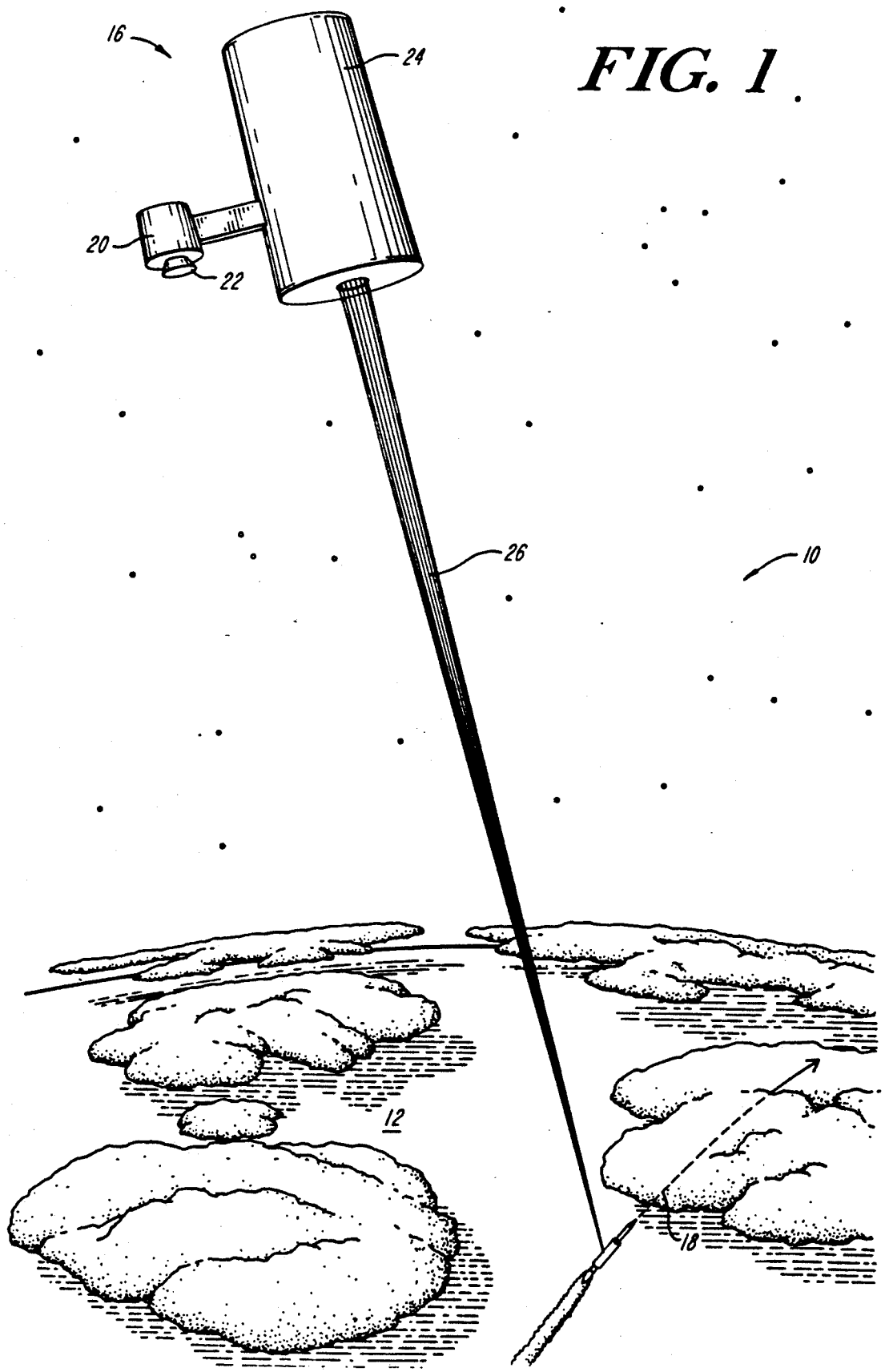
FIG. 1 is a pictorial view illustrating a typical applications environment for the rapid re-targeting space-based boresight alignment system and method for particle beams of the present invention.

Referring now to FIG. 1, generally designated at 10 is a pictorial view of a typical applications environment of the rapid re-targeting space-based boresight alignment system and method for particle beams according to the present invention. Above the earth generally designated 12 a space-based directed energy system generally designated 16 is positioned confronting a launch corridor schematically illustrated by arrow 18 through which ballistic missiles must pass after launch towards predesignated target locations. The directed energy system 16 includes a tracker 20 to be described having a field of view schematically illustrated by aperture 22 for providing surveillance of the corridor 18, and a directed energy source 24 to be described, preferably a source of neutral particles, so controlled by the tracker 20 in a manner to be described as to deliver the force of the directed energy neutral particle beam onto ballistic missile trajectories for destroying the ballistic missiles therealong as schematically illustrated by a beam designated 26.

Figure 2A:
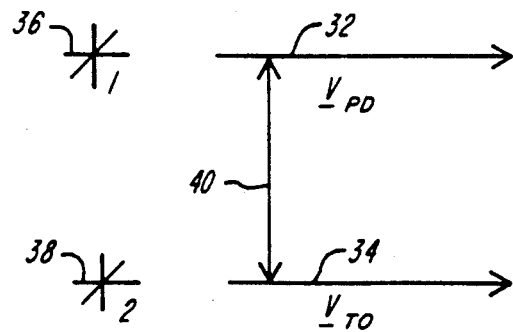
FIG. 2 illustrates in FIGS. 2A through 2C thereof diagrams useful in explaining the principles of the rapid re-targeting space-based boresight alignment system and method for particle beams according to the present invention.

Referring now to FIG. 2, generally designated at 30 in FIG. 2A is a diagram useful in explaining the principles of the rapid re-targeting space-based boresight alignment system and method for particle beams of the present invention. A vector 32 marked "$v_{PD}$" is representative of the pointing direction of the particle beam device 24 (FIG. 1), and a vector 34 marked "$v_{TO}$" is representative of the pointing direction to a ballistic missile that has been targeted by the tracker 20 (FIG. 1). As will be readily appreciated by those skilled in the art, the vector 32, which may be determined in any suitable manner as, for example, by laser resonance fluorescence, by pin-hole detection and by a wireshadow sensor, among others, is, in each instance, representative of the pointing direction of the beam device 24 (FIG. 1) as referenced to a first coordinate system 36 associated with the beam device 24 (FIG. 1). In like manner, the vector 34 is representative of the pointing direction to the targeted ballistic missiles or trajectories thereof as referenced to a second coordinate system 38 associated with the tracker 20 (FIG. 1). Due to the non-rigidity of the platforms 20, 24 (FIG. 1) relative to each other, and due, among other things, to the phenomena of vibrational modes of the platforms 20, 24 (FIG. 1) and space-noise, the relative position of the coordinate systems 36, 38 is uncertain, and the vectors 32, 34 defined with respect thereto lack registration as schematically illustrated by a dashed arrow 40 to an extent that depends on the degree of the uncertainty.

Figure 2B:
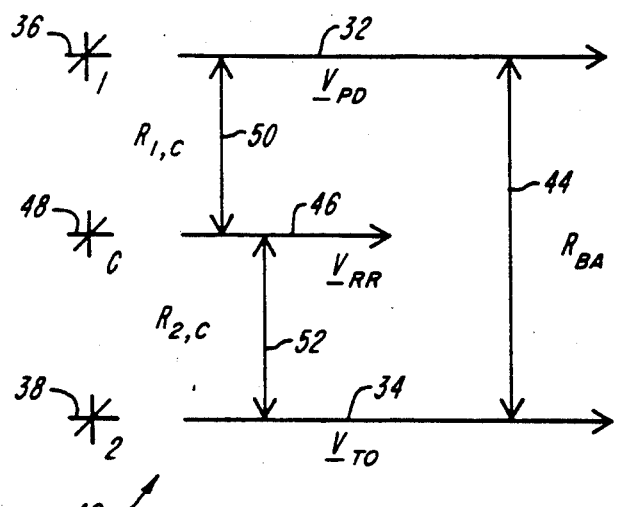

Referring now to FIG. 2B, generally designated at 42 is another diagram useful in explaining the principles of the rapid re-targeting space-based boresight alignment system and method for particle beams according to the present invention. Boresight alignment registration of the vectors 32, 34 to deliver the force of the neutral particle beam onto the ballistic missiles is illustrated by an arrow 44 marked "$R_{BA}$". The registration 44 in accordance with the present invention is accomplished by means of a registration reference vector 46 marked "$v_{RR}$" defined with respect to a coordinate system 48 that is in common with the coordinate systems 36, 38 of the vectors 32, 34 as illustrated by arrows 50, 52 respectively marked "$R_{1,C}$" and "$R_{2,C}$". In this manner, since the vector 32 is registered with the vector 46 on the one hand, as shown at 50, and since the vector 46 is registered with the vector 34 on the other hand, as shown at 52, the vector 32 is thereby registered with the vector 34, as shown at 44. Whereby, the platform non-rigidity and platform vibrational modes that would otherwise decouple the reference frames 36, 38 is effectively eliminated and extremely precise boresight alignment of the neutral particle beam to the targeted ballistic missiles is therewith accomplished.

Figure 2C:
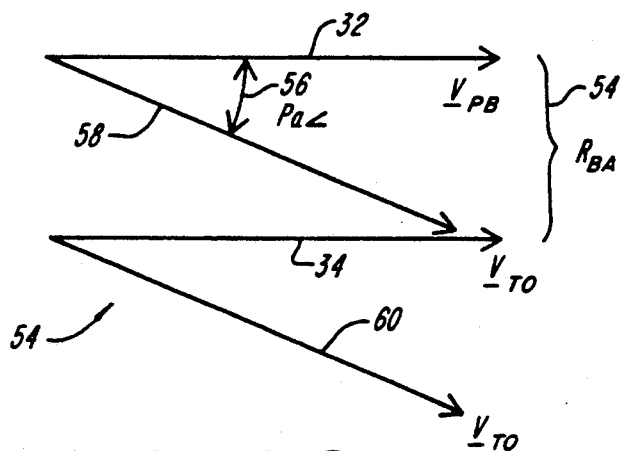

Referring now to FIG. 2C, generally designated at 54 is another diagram useful in explaining the principles of the rapid re-targeting space-based boresight alignment system and method for particle beams according to the present invention. The vectors 32, 34 are shown in FIG. 2C parallel to each other to schematically illustrate that they have been registered with respect to a common reference frame and thereby have been boresight aligned as illustrated by a bracket 54 marked "$R_{BA}$". To provide rapid target targeting and re-targeting to the trajectories of in-flight ballistic missiles, the pointing direction of the vector representative of the particle beam is controllably orientated through such a point-ahead angle illustrated at 56 and marked "pa<" that the beam of neutral particles 58 intercepts the targeted ballistic missiles along their projected flight trajectories 60 as schematically illustrated by the parallel relation between the vectors 58, 60.

Figure 3:
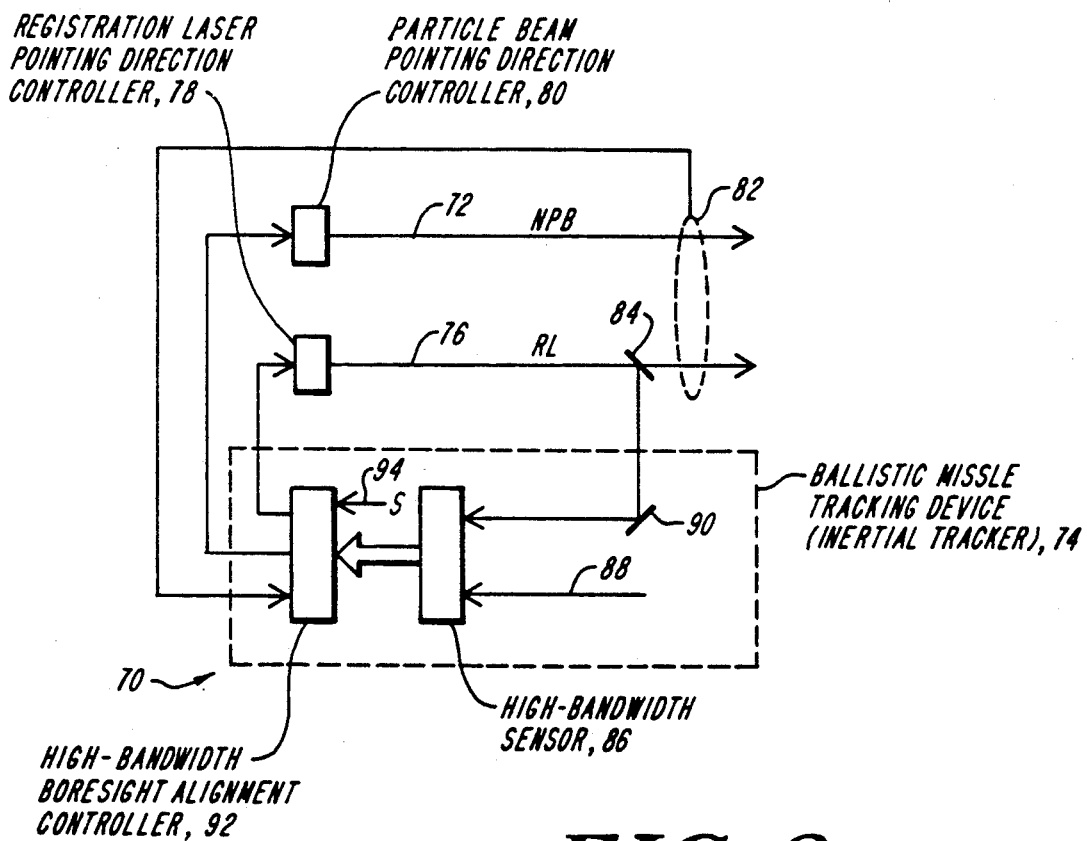
FIG. 3 is a block diagram of the rapid re-targeting space-based boresight alignment system and method for particle beams according to the present invention.

Referring now to FIG. 3, generally designated at 70 is a block diagram illustrating the rapid re-targeting space-based boresight alignment system and method for particle beams according to the present invention. A neutral particle beam is schematically illustrated by an arrow 72 marked "NPB", a ballistic missile tracking device is schematically illustrated by a dashed box 74, and a registration laser is schematically illustrated by an arrow 76 marked "RL". The particle beam 72 may be a neutral particle beam or a charged particle beam without departing from the inventive concept. The neutral particle beam 72 and registration laser 76 are shown in spaced apart relation for the sake of clarity of illustration, but are co-linear in fact, and traverse a common path. One or the other may be inside the other and of the same or different size, and one or the other or both may be continuous wave or pulsed without departing form the inventive concept. The tracker 74 may be any suitable tracker operative to provide vectors representative of the pointing direction to the targeted ballistic missiles or trajectories thereof and preferably is the tracker shown, described and claimed in the above-identified cognate allowed United States utility patent application.

The registration laser 76 includes a registration laser source, not shown, the output beam of which is controllably orientated in direction by a pointing direction controller 78. The controller 78 may include one or more specular members, not shown, positioned to intercept the output beam of the registration laser source, to the backs of each of which two-degree of freedom X,Y actuators, not shown, are mounted to controllably position the corresponding specular members and therewith the pointing direction of the registration laser in azimuth and in elevation.

The particle beam 72, preferably a neutral particle beam, includes a particle beam source, such as an ion source, not shown, the output beam of which is controllably orientated by a pointing direction controller 80. The controller 80 may include magnetic optics, not shown, operative to provide a controlled beam deflection in azimuth and in elevation in a manner well known to those skilled in the art. A sensor defining a reference frame and schematically indicated by a dashed ellipse 82, that preferably includes a wire mask, not shown, and a wire shadow sensor, not shown, is positioned in a common path with both the neutral particle beam 72 and the reference laser beam 76 to provide signals representative of the pointing direction of the neutral particle beam 72 and of the registration laser beam 76 both with respect to the reference frame of the sensor 82.

A laser sampler 84 is positioned along the optical path of the registration laser 76 for deviating, whether temporally or spacially, or both, a portion of the registration laser 76 to the tracker 74. Any suitable sampler 84, such as a beam splitter for CW light or a butterfly member for pulsed laser light, may be employed. It should be noted that although the sampler 84 is shown in a position downstream of the particle beam pointing direction controller 80, it may be positioned upstream thereof without departing from the inventive concept.

As described in the above-identified cognate United States utility patent application, the inertial tracker 74 includes a beam expander, not shown, having a field of view for gathering light energy within its field of view representative of targeted ballistic missiles, a high-bandwidth sensor 86 having a focal plane and a multi-spot tracking capability of the type disclosed and claimed in commonly-assigned U.S. Pat. No. 4,910,596 to Kieft, entitled, HIGH BANDWIDTH PLURAL SPOT VIDEO PROCESSOR, incorporated hereinby reference, a monolithic optical assembly, not shown, mounted to a common optical bench, not shown, that is rigidly attached to the beam expander for imaging light schematically illustrated by an arrow 88 gathered within the field of view of the beam expander as sensible spots of discrete light energy within the focal plane of the sensor 86 that are representative of targeted ballistic missiles, an inertial reference unit, not shown, an alignment laser, not shown, in spaced apart confronting relation to the beam expander and cooperative with the monolithic optics to inertially stabilize the sensible spots of light energy representative of the targeted ballistic missiles against space-noise and other disturbances, and plural, high and low bandwidth constitutive controllers, not shown, responsive to the alignment laser, inertial reference and inertially stabilized sensible spots of light energy representative of the targeted ballistic missiles and operative to provide the space-time coordinates and angular rate coordinates of targeted ballistic missiles with respect to inertial space. Reference in this connection may also be had to commonly assigned co-pending United States utility patent application by the same inventive entity as herein, and entitled BALLISTIC MISSILE BORESIGHT AND INERTIAL TRACKING SYSTEM AND METHOD, filed on even date herewith, Ser. No. 07/517,147 incorporated herein by reference.

Optical means schematically illustrated by element 90 cooperative with the laser sampler 84 and inertial tracker 74 are provided for imaging the sampled registration laser 76 onto the focal plane of the high-bandwidth sensor 86 as a sensible spot of inertially stabilized light energy representative of the pointing direction of the beam of the registration laser 76 with respect to inertial space. In the preferred embodiment, the optical means 90 is preferably the monolithic optics described and claimed in the above-identified cognate United States allowed and co-pending utility patent applications.

A high-bandwidth boresight alignment controller 92 is operatively coupled to the sensor 82 common to the neutral particle beam 72 and the registration laser beam 76, to the high-bandwidth sensor 86 having a multi-spot tracking capability, to the pointing direction controller 80 of the neutral particle beam 72, and to the pointing direction controller 78 of the registration laser 76.

In operation, the controller 92 is responsive to the inertially stabilized sensible spots of light energy on the sensor 86 representative of the pointing direction to the targeted ballistic missiles with respect to inertial space and to the sensible spot of light energy on the sensor 86 representative of the pointing direction of the registration laser 76 and operative to controllably actuate the pointing direction controller 76 to align the pointing direction of the registration laser in a preselected first relation with the pointing direction to the targeted ballistic missiles. The controller 92 is responsive to the signals representative of the pointing direction of the neutral particle beam 72 and of the pointing direction of the registration laser 76 both defined with respect to the common reference provided by the sensor 82 and is operative to controllably actuate the pointing direction controller 80 to align the pointing direction of the neutral particle beam 72 in a preselected second relation with the pointing direction of the registration laser beam 76. The pointing direction of the neutral particle beam is thereby registered with the pointing direction to the targeted ballistic missile trajectories, and in such a way that any uncertainty that would otherwise be introduced due to platform non-rigidity and vibrational modes, to space-noise, and due to other such factors, is therewith effectively eliminated.

To provide effective targeting and re-targeting to deliver the force of the neutral particle beam onto the targeted ballistic missile trajectories, the neutral particle beam is controllably orientated at a preselected point-ahead angle selected to intercept the ballistic missile trajectories. In one embodiment, the preselected first and second relations are selected such that the pointing direction of the neutral particle beam is aligned in a generally parallel relation with the pointing direction of the registration laser, which is, in turn, aligned to the vector representative of the pointing direction to the targeted ballistic missiles. For this embodiment, the point-ahead angle is implemented by controllably deviating the neutral particle beam at the time of firing with respect to the pointing direction of the registration laser to intercept the targeted ballistic missile trajectories. In accordance with another embodiment, the preselected first and second relations are selected such that the pointing direction of the registration laser is itself aligned at a preselected point-ahead angle selected to intercept the targeted ballistic missile trajectories, and the pointing direction of the neutral particle beam is aligned in a generally parallel relation to the registration laser. In both embodiments, the controller 92 is responsive to the sensible spots of inertially stabilized light energy on the sensor 86 representative of the pointing directions to the targeted ballistic missiles and representative of the pointing direction of the registration laser with respect to inertial space, is responsive to a range parameter 94 designated "s" handed over to it from a remote tracker, not shown, to calculate the point-ahead angle for a given range, and is responsive to the signals representative of the pointing directions of the neutral particle beam and registration laser provided by the common sensor 82, and operative to activate the pointing direction controllers 76, 80 to deliver the force of the neutral particle beam onto the targeted ballistic missile trajectories.

In the former embodiment, the preselected point-ahead angle is implemented by the controller 92 in response to the sensor 86 signals and sensor 82 signals and the range parameter 94 to actuate the pointing direction controllers 78, 80 to cause the vectors representative of the pointing direction of the neutral particle beam and registration laser to lie in a parallel relation just prior to firing and aligned with the vector representative of the pointing direction to the targeted ballistic missile, and to actuate the pointing direction controller 80 at the time of firing to cause the vector representative of the pointing direction of the neutral particle beam to be deviated out of parallel relation by the preselected point ahead angle selected to intercept the targeted ballistic missile trajectories.

In the latter embodiment, the preselected point-ahead angle is implemented by the controller 92 in response to the sensor 86 and sensor 82 signals and to the range parameter 94 to actuate the pointing direction controllers 78, 80 to cause the vectors representative of the pointing direction of the neutral particle beam and registration laser to lie in a parallel relation and aligned at the preselected point-ahead angle relative to the vector representative of the pointing direction to the targeted ballistic missile selected to intercept the ballistic missile trajectories.

In either embodiment, rapid targeting and re-targeting of the same or another ballistic missile is therewith assured.

Figure 4:
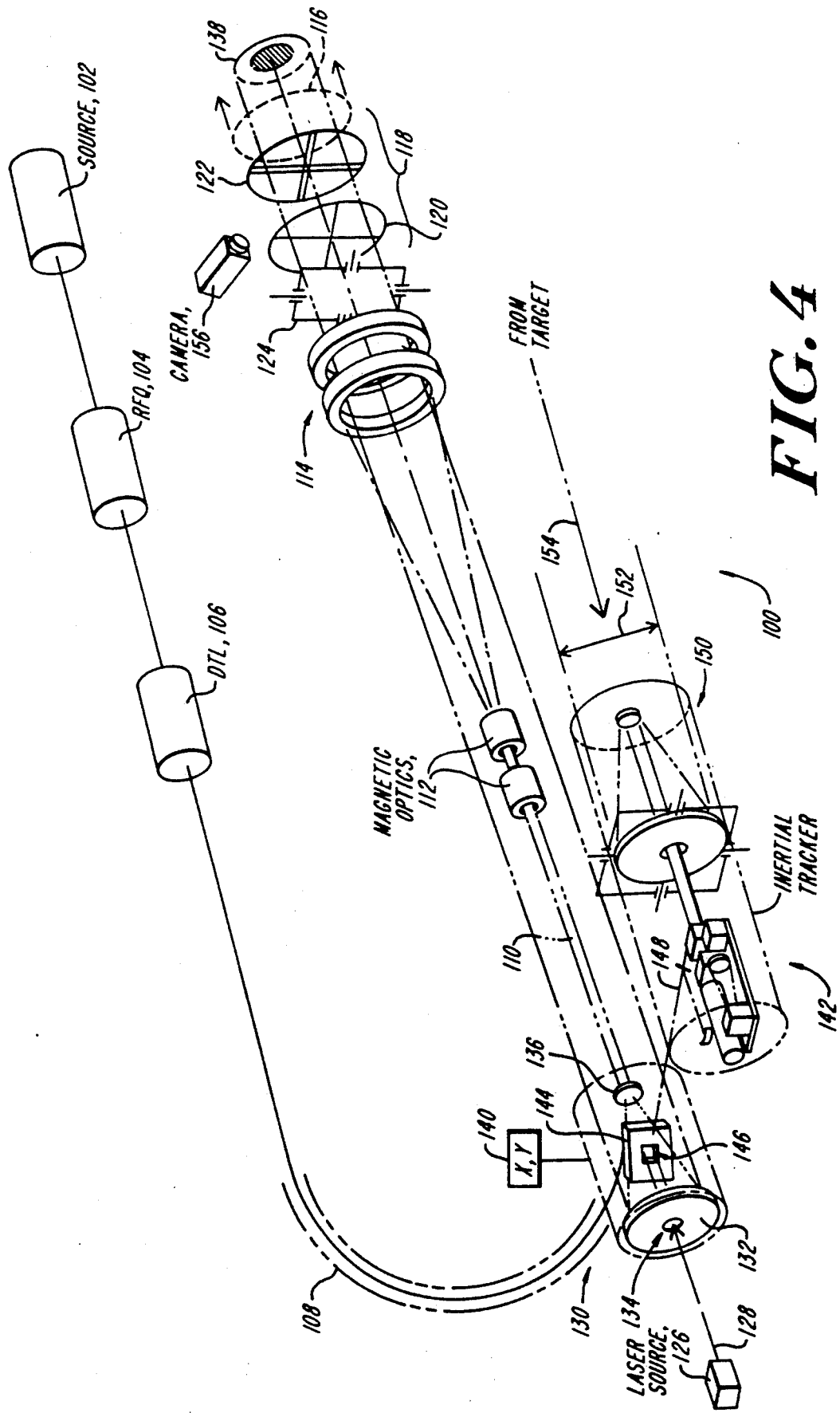
FIG. 4 is a perspective view illustrating one presently preferred embodiment of the rapid re-targeting space-based boresight alignment system and method for particle beams of the present invention.

Referring now to FIG. 4, generally designated at 100 is a perspective view illustrating one presently preferred embodiment of the rapid re-targeting space-based boresight alignment system and method for particle beams according to the present invention. An ion source and injector 102 is operative to provide a high-energy stream of charged particles that are accelerated in a first, so-called, RFQ accelerometer 104, and in a second, so-called, DTL accelerometer 106. The accelerated, charged ions are deviated through 180° by a bank of permanent magnets schematically illustrated in dashed/dotted outline 108 producing a beam of charged particles 110 traveling in 180° spacial opposition to the charged particles injected out of the ion source and injector 102.

The beam of charged particles 110 is controllably orientated by fine-steering magnetic optics generally designated 112 positioned along the beam path of the particle beam and by course-steering magnetic optics generally designated 114 downstream of the fine-steering magnetic optics 112 and positioned along the beam path of the beam 110 providing an annular beam illustrated in dashed outline 116 the vector representative of the pointing direction of which is controlled in azimuth and in elevation by the magnetic optics 112, 114.

A wire sensor illustrated by bracket designated 118 is positioned downstream of the course-steering magnetic optics 114. The wire sensor includes a wire mask 120 and a wire shadow sensor 122. The mask 120 casts a "shadow" on the sensor 122 in response to incident radiation representative of the pointing direction of the incident radiation in a manner well known to those skilled in the art. A stripper 124 is positioned intermediate the course-steering magnetic optics 114 and the wire sensor 118 for removing the charge out of the particle beam in well-known manner providing thereby a neutral particle beam.

A registration laser 126 providing a registration laser beam 128 in spaced apart confronting relation with a beam expander generally designated 130 are provided for injecting the registration laser beam 128 along a beam path that is common with the path of the neutral particle beam 110. The expander 130 includes a concave primary reflector 132 having a central aperture generally designated 134 therethrough, and a convex reflector 136 spaced from the reflector 132 and positioned concentrically with respect to the aperture 134 of the member 132. The registration laser beam 128 produced by the registration laser source 126 passes through the aperture 134 of the reflector 132 and is incident on the convex surface of the mirror 136 of the beam expander 130. The mirror 136 deviates it onto the confronting concave surface of the primary mirror 132, and the primary mirror 132, in turn, deviates it thereoff as an annular beam illustrated in dashed outline 138. Any suitable means, such as the system of two degree of freedom azimuthal and elevational sensors and corresponding azimuthal and elevational tilt actuators described in commonly assigned United States utility U.S. Pat. No. 4,766,393 of the same inventive entity as herein, entitled LIMITED DIFFRACTION FEEDBACK LASER SYSTEM, incorporated herein by reference, may be employed to maintain the registration laser 126 co-axially aligned with the aperture 134 of the beam expander 130 and to provide small-angle control of the pointing direction of the registration laser beam in azimuth and in elevation. A two degree of freedom actuator 140 may be coupled to the beam expander 130 to provide wide-angle control of the pointing direction of the registration laser.

An inertial tracker generally designated 142 of the type disclosed and claimed in the above-identified cognate allowed and co-pending United States utility patent applications is mounted in spaced-apart relation confronting the beam expander 130 on a boom, not shown.

A scraper mirror 144 having a central aperture generally designated 146 therethrough is positioned along the output path of the laser 126, with its aperture 146 co-axial therewith, for deviating a portion of the registration laser beam within the beam expander 130 along an optical path 148 to the inertial tracker 142.

The inertial tracker 142 has a beam expander generally designated 150 providing a field of view schematically illustrated by arrows 152, and is responsive to light illustrated by arrow 154 gathered within the field of view 152 of the beam expander 150 associated therewith to provide the space-time coordinates and angular rate coordinates of the targeted ballistic missiles with respect to inertial space as described above in connection with the description of FIG. 3 and as disclosed and claimed in the above-identified cognate United States utility patent applications. The inertial tracker 142 is responsive to the registration laser beam deviated thereto via the optical path 148 to provide vector information representative of the pointing direction of the registration laser with respect to inertial space as described above in connection with the description of FIG. 3.

A wire camera 156 responsive to the shadow cast on the wireshadow sensor 122 provides signals representative of the pointing direction of the neutral particle beam 116 and of the direction of the registration laser beam 138 with respect to the common reference frame of the wire sensor 118.

A controller, not shown, described above in connection with the description of FIG. 3, is operative in response to the signals representative of the pointing direction of the targeted ballistic missiles with respect to inertial space, to the signal representative of the pointing direction of the registration laser with respect to inertial space, and to the signals representative of the pointing directions of the registration laser and neutral particle beam with respect to the common reference frame of the wire sensor to actuate either or both the small-angle or wide-angle registration laser pointing direction controllers and the magnetic optics to boresight align the neutral particle beam at that preselected point-ahead angle selected to intercept the projected space-time coordinates of the targeted ballistic missile trajectories in either of the manners described above in connection with the description of FIG. 3.

Figure 5:
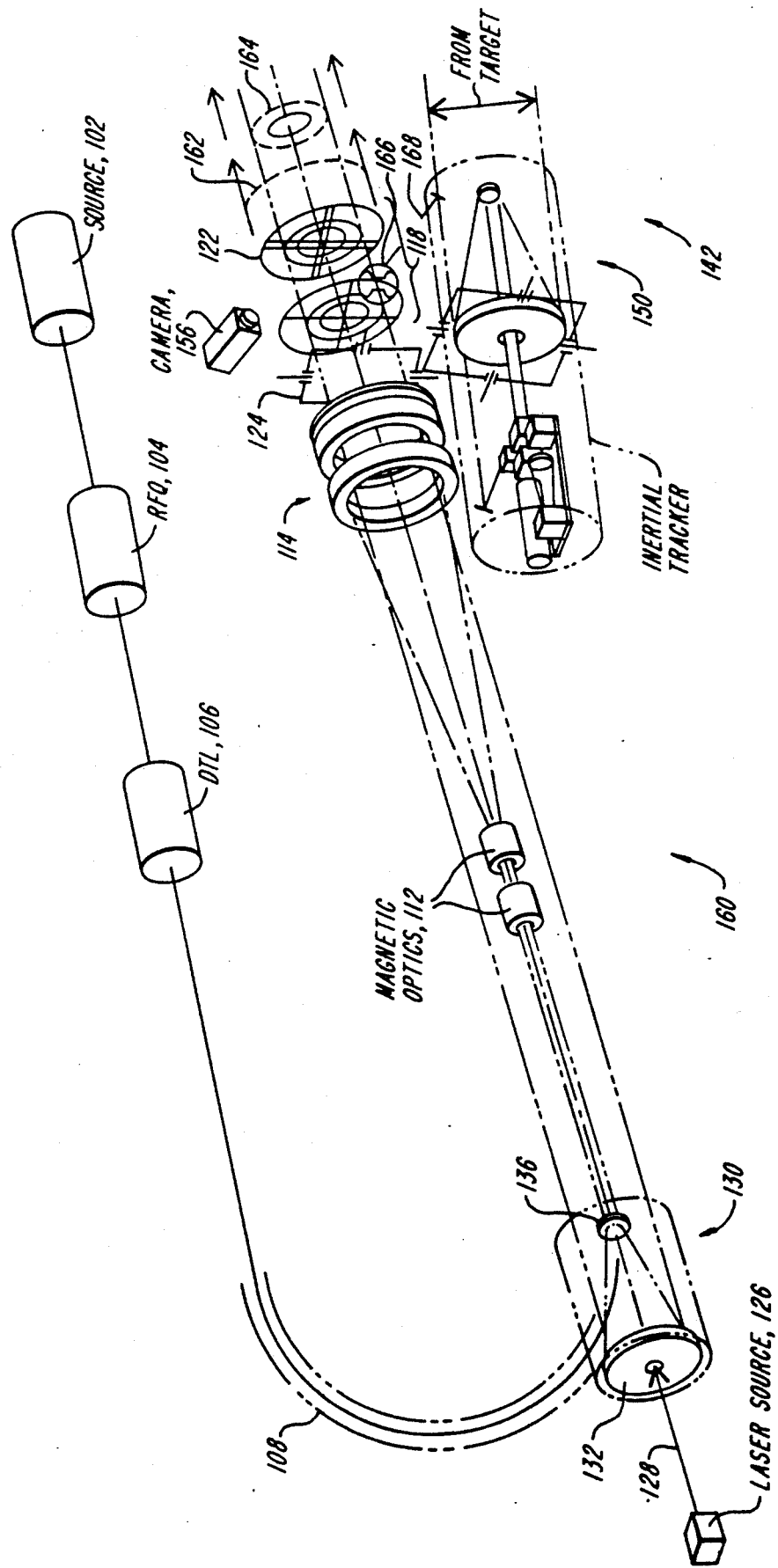
FIG. 5 is a perspective view illustrating another presently preferred embodiment of the rapid targeting space-based alignment system and method for particle beams of the present invention.

Referring now to FIG. 5, generally designated at 160 is a perspective view of another presently preferred embodiment of the rapid re-targeting space-based boresight alignment system and method for neutral particle beams according to the present invention. The embodiment 160 is generally the same as the embodiment 100 described above in connection with the description of FIG. 4, except that the registration laser beam, marked 162 in FIG. 5, is outside the neutral particle beam, marked 164 in FIG. 5, and the registration laser beam 162 is sampled downstream of the magnetic optics 112, 114 by any suitable means, such as by a butterfly mirror 166, the sampled output beam of which is fed along a beam path 168 to the the inertial tracker 142. Reference may be had to commonly-assigned United States utility U.S. Pat. No. 4,633,479, by Trageser, entitled: ALIGNMENT SYSTEM FOR A CONFOCAL UNSTABLE LASER RESONATOR, incorporated herein by reference, for a description of a suitable butterfly mirror 166. The operation of the embodiment of FIG. 5 is otherwise identical to the operation of the embodiment described above in connection with the description of FIG. 4, and is not described again for the sake of brevity of explication.

Many modifications of the presently disclosed invention will become apparent to those skilled in the art without departing from the inventive concept.

What is claimed is:

1. Registration apparatus, comprising:
   a first system for making first measurements on a first sensor that defines a first frame of reference;
   a second system different from the first system for making second measurements different from said first measurements on a second sensor that defines a second frame of reference different from the first frame of reference, wherein said first and second frames of reference are positionally uncertain with respect to each other;
   means coupled to said first and said second systems for providing a reference signal measurable in common on both the first and second sensors with respect to the first and second different frames respectively defined by the first and second systems;
   means responsive to the first measurements and the reference signal for providing a first signal representative of the registration of the first measurements and therewith the first frame with respect to the reference signal;
   means responsive to the reference signal and to the second measurements for providing a second signal representative of the registration of the second measurements and therewith the second frame with respect to the reference signal;
   means responsive to the first and second signals for providing a third signal representative of the registration of the first measurements with respect to the second measurements and therewith of the first frame with respect to the second frame.

2. The apparatus of claim 1, wherein said reference signal providing means includes a registration laser.

3. The apparatus of claim 2, wherein said first measurements are representative of the pointing direction of a particle beam, and said second measurements are representative of the pointing direction to remote target objects.

4. The apparatus of claim 3, wherein said particle beam is a neutral particle beam.

5. The apparatus of claim 4, wherein said first signal providing means includes a wire sensor positioned along a beam path common to the registration laser and neutral particle beam.

6. The apparatus of claim 5, wherein said second signal providing means includes an inertial tracker having a sensor, and means for imaging the registration laser on the sensor of the inertial tracker.

7. The apparatus of claim 6, wherein said third signal providing means includes a high bandwidth controller.

8. Rapid re-targeting boresight alignment transfer apparatus transferring a space-based particle beam having a particle beam path that is controlled in orientation by a particle beam pointing direction controller onto remote ballistic missiles, comprising:

a registration laser system providing a registration laser beam along a portion of the particle beam path and having a pointing direction;

means cooperative with the registration laser for controlling the pointing direction of the registration laser beam;

first sensor means defining a first reference associated therewith responsive to the registration laser beam and to the particle beam for providing first signals representative of the pointing direction of the particle beam and of the registration laser beam both with respect to the first reference;

a ballistic missile tracker having a second sensor defining a second reference associated therewith and a field of view for providing second signals representative of the pointing direction to targeted ballistic missiles within its field of view with respect to the second reference;

means responsive to the registration laser beam and cooperative with the second sensor for providing a third signal representative of the pointing direction of the registration laser beam with respect to the second reference;

controller means coupled to the particle beam pointing direction controller and to the registration laser pointing direction controller means and responsive to the first signals, to the second signals, to the third signal, and to a signal representative of distance to the targeted ballistic missiles for aligning the registration laser beam and the particle beam in a preselected first relation and for aligning the registration laser beam in a preselected second relation with the pointing direction to the targeted ballistic missiles, the first and second preselected relations being selected to boresight align the particle beam at that point ahead angle that intercepts the ballistic missile trajectories; and wherein the first and second preselected relations are selected such that the pointing direction of the registration laser beam is aligned at the point ahead angle, and wherein the neutral particle beam is aligned in a generally parallel relation with the pointing direction of the registration laser beam.

9. Rapid re-targeting boresight alignment transfer apparatus transferring a space-based particle beam having a particle beam path that is controlled in orientation by a particle beam pointing direction controller onto remote ballistic missiles, comprising:

a registration laser system providing a registration laser beam along a portion of the particle beam path and having a pointing direction;

means cooperative with the registration laser for controlling the pointing direction of the registration laser beam;

first sensor means defining a first reference associated therewith responsive to the registration laser beam and to the particle beam for providing first signals representative of the pointing direction of the particle beam and of the registration laser beam both with respect to the first reference;

a ballistic missile tracker having a second sensor defining a second reference associated therewith and a field of view for providing second signals representative of the pointing direction to targeted ballistic missiles within its field of view with respect to the second reference;

means responsive to the registration laser beam and cooperative with the second sensor for providing a third signal representative of the pointing direction of the registration laser beam with respect to the second reference;

controller means coupled to the particle beam pointing direction controller and to the registration laser pointing direction controller means and responsive to the first signals, to the second signals, to the third signal, and to a signal representative of distance to the targeted ballistic missiles for aligning the registration laser beam and the particle beam in a preselected first relation and for aligning the registration laser beam in a preselected second relation with the pointing direction to the targeted ballistic missiles, the first and second preselected relations being selected to boresight align the particle beam at that point ahead angle that intercepts the ballistic missile trajectories; and wherein the first and second preselected relations are selected such that the pointing direction of the registration laser beam and the pointing direction of the particle beam are aligned in a generally parallel relation, and the pointing direction of the neutral particle beam is aligned at the time of firing at the point ahead angle relative to the pointing direction of the registration laser beam.

10. The rapid re-targeting boresight alignment transfer apparatus of claims 8 or 9, wherein said particle beam is a neutral particle beam.

11. The rapid re-targeting boresight alignment transfer apparatus of claims 8 or 9, wherein said first sensor means includes a wire sensor.

12. The rapid re-targeting boresight alignment transfer apparatus of claim 11, wherein said wire sensor means includes a wire mask and a wire shadow sensor.

13. The rapid re-targeting boresight alignment transfer apparatus of claims 8 or 9, wherein said second sensor is an inertial tracker operative to provide the space-time coordinates and angular rate coordinates of targeted ballistic missiles with respect to inertial space.

14. The rapid re-targeting boresight alignment transfer apparatus of claims 8 or 9, wherein said registration laser beam has a beam aperture, said particle beam has a beam aperture, and wherein said aperture of said registration laser beam is larger than said aperture of said particle beam.

15. The rapid re-targeting boresight alignment transfer apparatus of claims 8 or 9, wherein said registration laser beam has a beam aperture, said particle beam has a beam aperture, and wherein said aperture of said registration laser is smaller than said aperture of said particle beam.

16. The rapid re-targeting boresight alignment transfer apparatus of claims 8 or 9, wherein said registration laser has a beam aperture, said particle beam has a beam aperture, and wherein said apertures of said registration laser beam and of said particle beam are generally coextensive.

17. The rapid re-targeting boresight alignment transfer apparatus of claims 8 or 9, wherein at least one of said registration laser beam and said particle beam is pulsed.

18. The rapid re-targeting boresight alignment transfer apparatus of claims 8 or 9, wherein at least one of said registration laser beam and said particle beam is continuous wave.

19. The rapid re-targeting boresight alignment transfer apparatus of claims 8 or 9, wherein one of said registration laser beam and said particle beam are pulsed, and the other of said registration laser beam and said particle beam are continuous wave.

20. The rapid re-targeting boresight alignment transfer apparatus of claims 8 or 9, wherein said third signal providing means includes a registration laser sampler.

21. The rapid re-targeting boresight alignment transfer apparatus of claim 20, wherein said particle beam pointing direction controller includes magnetic optics, and wherein said laser sampler is positioned downstream of said magnetic optics.

22. The rapid re-targeting boresight alignment transfer apparatus of claim 20, wherein said particle beam pointing direction controller includes magnetic optics, and wherein said laser sampler is positioned upstream of said magnetic optics.

23. The rapid re-targeting boresight alignment transfer apparatus of claim 20, wherein said laser sampler includes a beam splitter.

24. The rapid re-targeting boresight alignment transfer apparatus of claim 20, wherein said laser sampler includes a butterfly mirror.

25. The rapid re-targeting boresight alignment transfer apparatus of claims 8 or 9, wherein said registration laser system includes a beam expander, and wherein said registration laser pointing direction controlling means includes an actuator coupled to said beam expander.

26. The rapid re-targeting boresight alignment transfer apparatus of claim 25, wherein the beam expander has an aperture, and further including means for keeping the registration laser beam centered with the beam expander aperture.

27. Boresight alignment apparatus registering a vector representative of the pointing direction of a particle beam of a space-based particle beam source to vectors representative of the pointing direction to targeted ballistic missiles with respect to a common reference frame thereby enabling to deliver the force of the particle beam to the ballistic missiles trajectories with assured lethality, comprising:
a registration laser;
means for injecting the registration laser into the particle beam;
a sensor means defining a frame of reference positioned along a path that is common to both the registration laser and the particle beam for providing signals representative of the relative pointing directions of the particle beam and registration laser with respect to the frame of reference of the sensor means;
an inertial tracker having a ballistic missile tracking sensor for providing signals representative of the pointing directions to targeted ballistic missiles with respect to inertial space;
means for imagining the registration laser on the ballistic missile tracking sensor for providing a signal representative of the pointing direction of the registration laser with respect to inertial space; and
control means responsive to the signals representative of the pointing directions of the particle beam and registration laser with respect to the frame of reference of the sensor means and responsive to the signal representative of the pointing direction of the registration laser with respect to inertial space for registering the pointing direction of the particle beam to the targeted ballistic missiles trajectories.

28. The boresight alignment apparatus of claim 27, wherein said particle beam is a neutral particle beam.

29. The boresight alignment apparatus of claim 28, wherein the neutral particle beam is controllably pointed by magnetic optics, and wherein the imaging means includes a sampling element positioned upstream of the magnetic optics.

30. The boresight alignment apparatus of claim 28, wherein the neutral particle beam is controllably pointed by magnetic optics, and wherein said imaging means includes a sampling element positioned downstream of the magnetic optics.

31. The boresight alignment apparatus of claim 27, wherein the sensor means is a wire sensor means.

32. The boresight alignment apparatus of claim 27, wherein the registering control means includes means for maintaining the pointing directions of the neutral particle beam and registration laser in parallel and aligned with the vectors representative of the pointing directions to the targeted ballistic missiles, and means for deviating the pointing direction of the neutral particle beam at the time of firing to the pointing directions of the ballistic missile trajectories.

33. The boresight alignment apparatus of claim 27, wherein the registering control means includes means for maintaining the pointing directions of the neutral particle beam and registration laser in parallel and aligned with the vectors representative of the pointing directions to the ballistic missiles trajectories.

* * * * *